United States Patent [19]

Saito et al.

[11] Patent Number: 4,602,301

[45] Date of Patent: Jul. 22, 1986

[54] TWO SIDED MAGNETIC DISK DRIVE APPARATUS WITH CONTROLLED TIMING MEANS

[75] Inventors: Shunji Saito, Numazu; Tetsuro Ichitani, Mishima, both of Japan

[73] Assignee: Tokyo Electric Co., Ltd., Tokyo, Japan

[21] Appl. No.: 570,357

[22] Filed: Jan. 13, 1984

[30] Foreign Application Priority Data

Jan. 21, 1983 [JP] Japan ................................... 58-8250

[51] Int. Cl.⁴ .......................... G11B 5/02; G11B 21/08
[52] U.S. Cl. ........................................ 360/69; 360/70; 360/75; 360/78
[58] Field of Search ...................... 360/118, 69, 70, 75, 360/78, 73

[56] References Cited

U.S. PATENT DOCUMENTS 3,860,958 1/1975 Hanson ................................ 360/118
4,300,174 11/1981 Harman et al. ................... 360/66 X
4,367,505 1/1983 Stromsta et al. ................. 360/118 X

FOREIGN PATENT DOCUMENTS 2654577 6/1978 Fed. Rep. of Germany .
3037563 5/1982 Fed. Rep. of Germany ........ 360/69
57-58268 4/1982 Japan ................................... 360/118

Primary Examiner—Raymond F. Cardillo
Assistant Examiner—Alyssa H. Bowler
Attorney, Agent, or Firm—Frishauf, Holtz, Goodman & Woodward

[57] ABSTRACT

A magnetic disk drive apparatus writes data in a magnetic disk by use of first and second magnetic heads. The track position on the magnetic disk where the first or second magnetic head exists is detected, and a delay time corresponding to the detected track position is set into a timer circuit. In the write-in mode, a CPU starts the operation of a read/write head section of the selected one of the first and, second magnetic heads and thereafter, when a delay time which is set into the timer circuit has passed, the CPU starts the operation of an erase head section of the selected one of the first and second magnetic heads.

2 Claims, 12 Drawing Figures

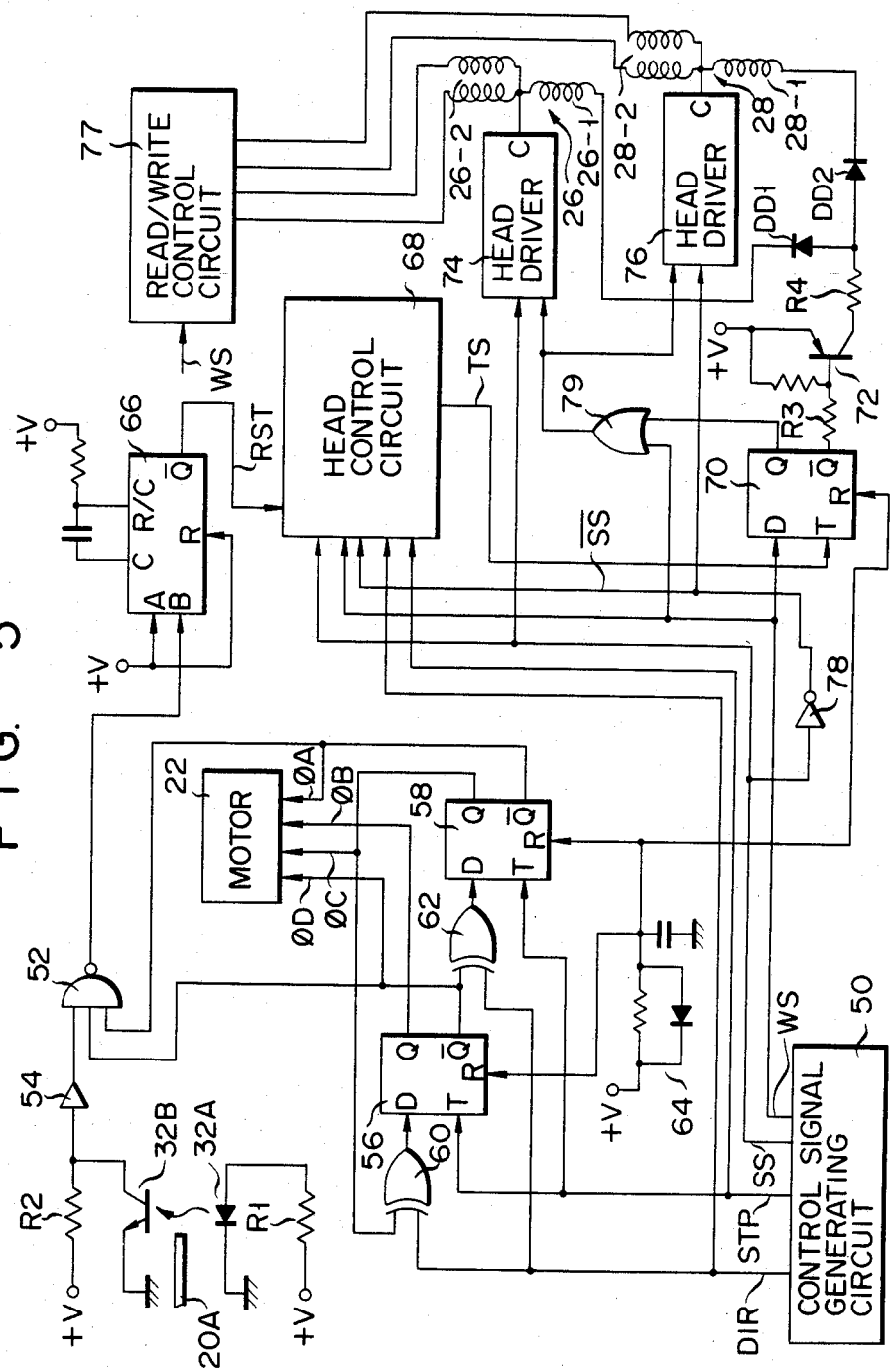
F I G. 5

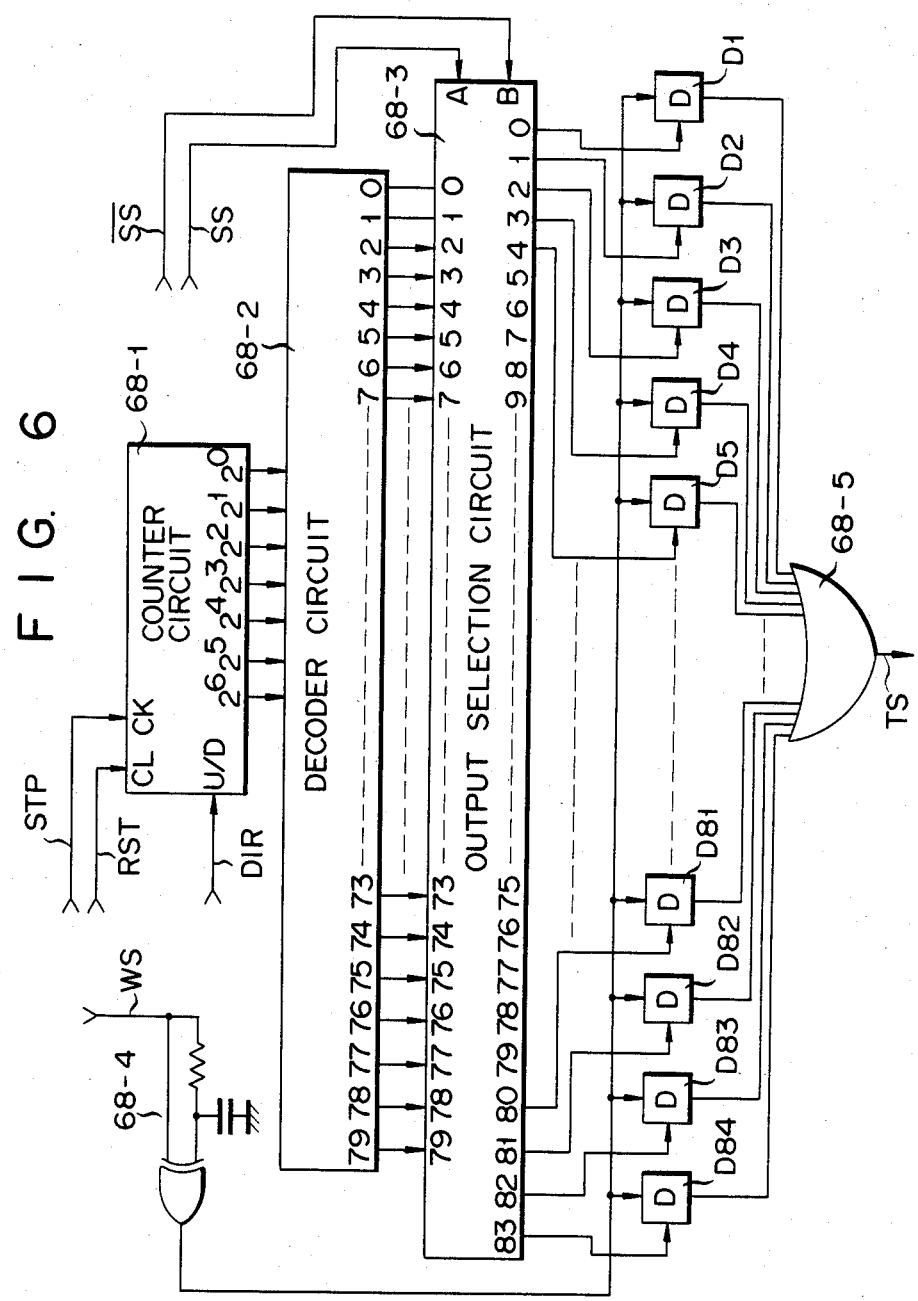
F I G. 6

TWO SIDED MAGNETIC DISK DRIVE APPARATUS WITH CONTROLLED TIMING MEANS

BACKGROUND OF THE INVENTION

The present invention relates to a magnetic disk drive apparatus to record data in a magnetic disk memory by a magnetic head mechanism having read/write and erase heads.

Generally, a magnetic disk drive apparatus comprises a spindle drive section to rotate a spindle on which a magnetic disk is mounted, and a carrier drive section to move a carrier on which the magnetic head is mounted in radial direction of the magnetic disk. This magnetic disk drive apparatus is coupled to a host computer and enables data to be written in a desired location on the magnetic disk and enables data to be read out from a desired location, by controlling the operations of the spindle drive section and carrier drive section in accordance with control data to be generated from the host computer.

The magnetic head to be used in this kind of magnetic disk drive apparatus has a read/write head section 2 and an erase head section 3 which are mutually disposed with a predetermined distance along the rotation direction of a magnetic disk 1, as shown in FIG. 1. In the write-in mode, the magnetic disk 1 is rotated in the direction indicated by an arrow in FIG. 1 and data is written in a track 4 of the magnetic disk 1 by the read/write head section 2, and at the same time the data previously written in the region out of the track 4 is erased by the erase head section 3. In this case, since the read/write head section 2 and the erase head section 3 are disposed apart from each other, in order to make the recording range by the read/write head section 2 coincide with the erasing range by the erase head 3, it is necessary to delay the operation start and stop timings of the erase head section 3 by a proper delay time with respect to the operation start and stop timings of the read/write head section 2. Now, the distance between the read/write head section 2 and the erase head section 3 is fixed, while circumferential speeds at the outermost peripheral and innermost peripheral tracks of the magnetic disk 1 differ; therefore, the above-mentioned proper delay times would differ in the cases where the magnetic head is on the outermost peripheral and innermost peripheral tracks. Namely, in the case where the magnetic head is on the outermost peripheral track, the above-mentioned proper delay time is set to be shorter than that in the case where the magnetic head is on the innermost peripheral track. Thus, in order to erase every data in the track edge region by the erase head section 3, for example, it is required to set the delay time relating to the operation start timing of the erase head section 3 to be equal to the optimum delay time which is set in the case where the magnetic head is on the outermost peripheral track; in addition, it is necessary to set the delay time with respect to the operation stop timing of the erase head section 3 to be equal to the optimum delay time which is set in the case where the magnetic head is on the innermost peripheral track. However in this case, if the magnetic head is on the innermost peripheral track, the erasing operation will be started early, while if the magnetic head is on the outermost peripheral track, the erasing operation will be stopped at a later timing. For example, when the central axes of the read/write head section 2 and the erase head section 3 are out of the central axis of the track, i.e., when the magnetic head is in the off-track position, the data which has been previously written will be partially erased.

In addition, there is conventionally known a magnetic disk drive apparatus having two magnetic heads 5 and 6 which are disposed to face each other with respect to the magnetic disk 1 so that data can be recorded on both sides of the magnetic disk 1. Head sections 5A and 6A of these magnetic heads 5 and 6 are disposed apart from each other in the radial direction of the magnetic disk 1. For example, the head section 5A of the magnetic head 5 which is arranged on one surface side of the magnetic disk 1 is disposed in a position which is shifted by a few tracks in the outer peripheral direction of the magnetic disk 1 as compared with the head section 6A of the magnetic head 6, which is arranged on the other surface side of the magnetic disk 1. This is because pad sections 6B and 5B to support the portions of the magnetic disk 1 on the opposite sides of the head sections 5A and 6A, are formed integrally with the head sections 6A and 5A, respectively. In addition, in the case where the numbers of tracks on both sides of the magnetic disk 1 are equally set, the outermost peripheral track on the one suface side of the magnetic disk 1 is formed to be out of position by a predetermined number of tracks outwardly from the outermost peripheral track on the other surface side. On the contrary, the innermost peripheral track on the other surface side is formed to be out of position by a predetermined number of tracks in the inside direction from the innermost peripheral track on the one surface side.

In the magnetic disk drive apparatus of the above kind, the delay times with respect to the operation start timings of the erase head sections of the magnetic heads 5 and 6, are set to be equal to the optimum delay time which is set in the case where the magnetic head 5 is on the outermost peripheral track on the one surface side of the magnetic disk. On the other hand, the delay times relating to the operation stop timings of the erase head sections, are set to be equal to the optimum delay time which is set in the case where the magnetic head 6 is on the innermost peripheral track on the other surface side of the magnetic disk. Due to this, all the data in the track edge region may be erased. However, as described above, if the delay times with respect to the operation start and stop timings of the erase head sections are set, part of the data which has been previously written will be erased over a wider range as compared with the previously-mentioned one-side recording method. In the case where the magnetic head is set in the off-track state, it may be impossible to correctly the read out data which was partially erased.

Further, in the magnetic disk drive apparatus of this kind, each track is divided into a plurality of sectors, and read/write operation is effected for each sector. The adjacent sectors are divided by a gap area so that data stored in the adjacent sectors may not affect each other. The number of bytes alloted for the gap area is determined in accordance with the degree of fluctuation in rotation of a disk driving motor, and the delay times of the operation start and stop timings of the erase head section. It is required to decrease the number of bytes for the gap area in order to increase the amount of data to be stored in each track. Therefore, it is important to shorten the delay times of the erase head section.

SUMMARY OF THE INVENTION

It is an object of the present invention to provide a magnetic disk drive apparatus which can write data effectively in any of the tracks of a magnetic disk, and which can effectively erase unwanted data in a track edge region.

Such object is accomplished by a magnetic disk drive apparatus comprising a data generating circuit to generate track position designation data; a first drive section to rotate a magnetic disk; a magnetic head mechanism having read/write head and erase head sections which are formed a predetermined distance from each other along a track of the magnetic disk; a second drive section to move the magnetic head to a track position designated on the magnetic disk in accordance with the track position designation data; and a control circuit which sets a delay time responsive to the track position designation data in the write-in mode, and starts or stops the operation of the erase head section the above-mentioned delay time after the operation of the erase head section is started or stopped.

In the present invention, delay times relating to the operation start and stop timings of the erase head section are suitably set for each track; therefore, even in the case where the magnetic head locates on any track, data can be effectively written in each track region, while erasing effectively unwanted data written in the track edge region.

BRIEF DESCRIPTION OF THE DRAWING

FIG. 5 is a circuit diagram of the magnetic disk drive apparatus according to one embodiment of the present invention;

FIG. 6 is a circuit diagram of a head control circuit which is used in the magnetic disk drive apparatus shown in FIG. 5;

DETAILED DESCRIPTION OF THE PREFERRED EMBODIMENTS

Figure 1:
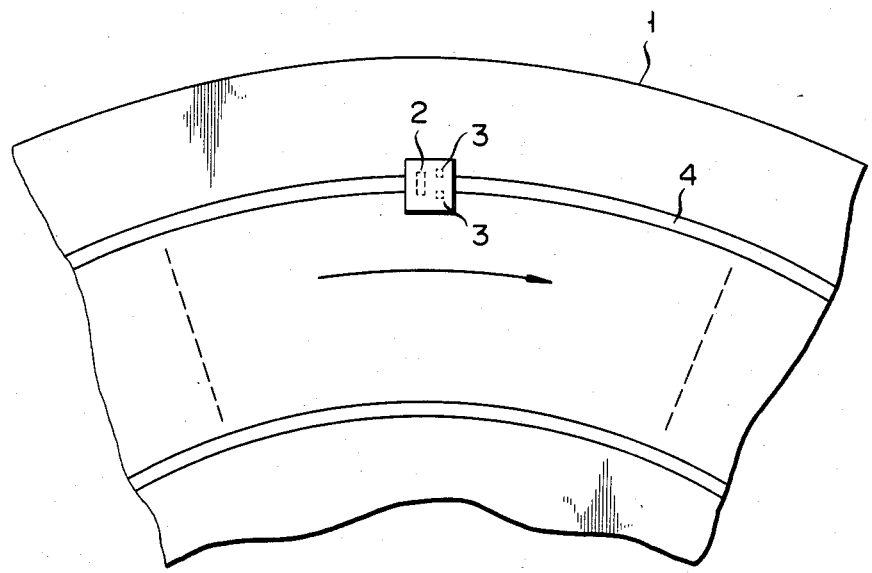
FIG. 1 is a diagram to explain the positional relationship between a magnetic head and a magnetic disk which are used in a conventional magnetic disk drive apparatus.
Figure 2:
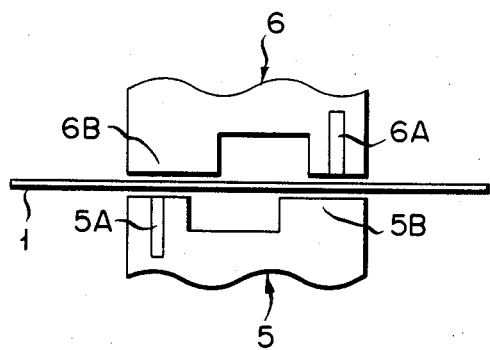
FIG. 2 is a diagram to explain the mutual positional relationship between a pair of magnetic heads which are used in a conventional magnetic disk drive apparatus.
Figure 3:
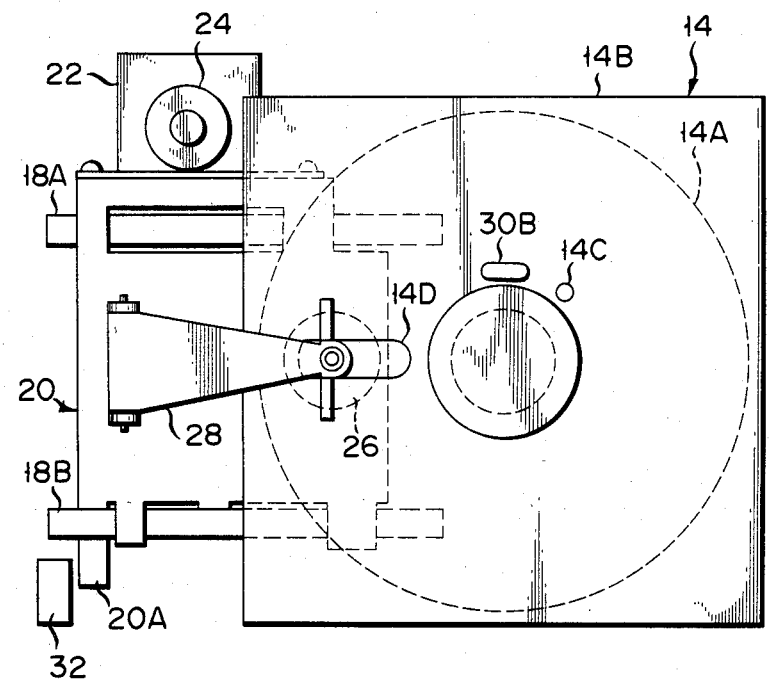
FIGS. 3 and 4 are a top plan view and a side elevational view of a magnetic disk drive apparatus according to one embodiment of the present invention.
Figure 4:
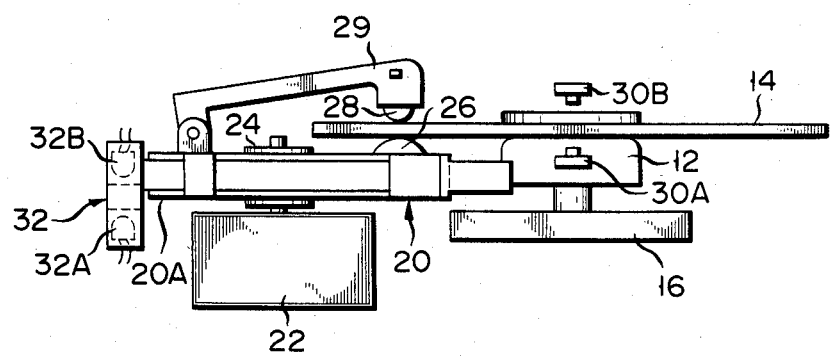

FIGS. 3 and 4 are a schematic top plan view and a side elevational view of a magnetic disk drive apparatus according to one embodiment of the present invention. The disk drive apparatus comprises a spindle 12 to hold a floppy disk 14 which is used as a magnetic disk; a motor 16 to rotate the spindle 12; two fixed shafts 18A and 18B; a head carrier 20 slidably attached on the shafts 18A and 18B; and a motor 22 to drive the head carrier 20 through a pulley 24 along the shafts 18A and 18B. The floppy disk 14 comprises a disk medium 14A and a casing 14B to enclose the disk medium 14A. An index hole 14C is formed in the floppy disk 14 and also long holes 14D extending in the radial direction of the disk medium 14A are formed in the casing 14B. A magnetic head 26 and a press-contacting member 29 with a magnetic head 28 attached at its end portion are mounted on the head carrier 20. This press-contacting member 29 is formed in a manner to allow the magnetic heads 26 and 28 to be brought into contact with the disk medium 14A through the long holes 14D. Furthermore, this magnetic disk drives apparatus has an index sensor formed of a light emitting diode 30A and a phototransistor 30B for generating an output signal when the index hole 14C in the floppy disk 14 is detected; and an outer peripheral limit position detector 32 for detecting that the magnetic heads 26 and 28 are in the outer peripheral limit position of the floppy disk 14 by detecting a projecting portion 20A of the carrier 20. This detector 32 is constituted by a light emitting diode 32A and a phototransistor 32B.

FIG. 5 is a circuit diagram of the magnetic disk drive apparatus according to one embodiment of the present invention. The magnetic disk drive apparatus includes a control signal generating circuit 50 to generate control signals; and the light emitting diode 32A and the phototransistor 32B which constitute the outer peripheral limit position detector 32. The light emitting diode 32A is coupled to a power supply terminal +V through a resistor R1 and emits light toward the base of the phototransistor 32B. The emitter of this phototransistor 32B is grounded, while the collector is coupled to the power supply terminal +V through a resistor R2 and at the same time it is connected to a NAND gate 52 through a buffer 54.

A direction instruction signal DIR from the control signal generating circuit 50 is respectively supplied to D input terminals of flip-flops 56 and 58 through exclusive OR gates 60 and 62. A $\overline{Q}$ output terminal of the flip-flop 56 and a Q output terminal of the flip-flop 58 are connected to the exclusive OR gates 62 and 60, respectively. A step signal STP is supplied from the control signal generating circuit 50 to trigger terminals T of the flip-flops 56 and 58, while their reset terminals R are coupled to an initial reset circuit 64 which generates a reset signal when the power supply is turned on. The flip-flops 56 and 58 and the exclusive OR gates 60 and 62 cooperatively constitute a motor driver. The $\overline{Q}$ output signal of the flip-flop 58, the Q output signal of the flip-flop 56, the Q output signal of the flip-flop 58, and the $\overline{Q}$ output signal of the flip-flop 56 are supplied to the motor 22 as motor drive signals $\phi_A$, $\phi_B$, $\phi_C$, and $\phi_D$ to drive the motor 22. The Q output signals of the flip-flops 56 and 58 are slso supplied to the above-mentioned NAND gate 52. An output terminal of this NAND gate 52 is coupled to a B input terminal of a monostable multivibrator 66. This monostable multivibrator 66 supplies a counter reset signal RST to a head control circuit 68 in response to a "0" level signal from the NAND gate 52. The head control circuit 68 supplies a trigger signal TS to a trigger terminal T of a flip-flop 70 in response to the direction instruction signal DIR, step signal STP, side selection signal SS, and write signal WS from the control signal generating circuit 50. The write signal WS from the control signal generating circuit 50 is supplied to a D input terminal of the flip-flop 70, and the initial reset circuit 64 is coupled to a reset terminal R of the flip-flop 70. A $\bar{Q}$ output terminal of this flip-flop 70 is coupled to the base of a pnp transistor 72 through a resistor R3. The emitter of this transistor 72 is coupled to the power supply terminal +V and the collector is coupled to one terminal of an erase head section 26-1 of the magnetic head 26 through a resistor R4 and a diode DD1, and at the same time it is connected to one terminal of an erase head section 28-1 of the magnetic head 28 through the resistor R4 and a diode DD2. In addition, the other terminals of the erase head sections 26-1 and 28-1 are coupled to common terminals C of head drivers 74 and 76, respectively. A read/write head section 26-2 of the magnetic head 26 is comprised of a pair of coils which are each coupled at one end to the common terminal C of the head driver 74 and are coupled at the other end to a read/write control circuit 77. A read/write head section 28-2 of the magnetic head 28 is comprised of a pair of coils which are each coupled at one end to the common terminal C of the head driver 76 and are coupled at the other end to the read/write control circuit 77. Also, the side selection signal SS from the control signal generating circuit 50 is directly supplied to the head driver 74, and at the same time it is also supplied to the head driver 76 through an inverter 78. Further, a Q output signal from the flip-flop 70 and a write signal WS are supplied to an OR gate 79 whose output terminal is connected to the head drivers 74 and 76. The operation mode of each of the head drivers 74 and 76 is determined in accordance with the side selection signal SS or $\overline{SS}$ and an output signal from the OR gate 79. The operation mode of the read/write control circuit 77 is determined in accordance with the write signal WS.

FIG. 6 is a circuit diagram of the head control circuit 68. The head control circuit comprises an up-down counter circuit 68-1 to count the step signal from the control signal generating circuit 50; a decoder circuit 68-2 to decode count data from the counter circuit 68-1; an output selection circuit 68-3 to generate selected output signals from the decoder circuit 68-2 responsive to the side selection signals SS and $\overline{SS}$ from the control signal generating circuit 50; 84 delay circuits D1 to D84 which are coupled to output terminals "0" to "83" of the output selection circuit 68-3; and a write-in pulse generator 68-4 to generate a write-in pulse in response to the write signal WS. Each delay time of these delay circuits D1 to D84 is set to be equal to the optimum delay time between the operation start or stop timings of the read/write and erase head sections which is given when the magnetic head 26 or 28 exists on a corresponding track. In addition, only when each of the delay circuits D1 to D84 is energized by an output signal from the output selection circuit 68-3, it supplies an output signal from the write-in pulse generator 68-4 to the trigger terminal of the flip-flop 70 through an OR gate 68-5 after it was delayed by a specified delay time.

The counter circuit 68-1 is set into the upcounting mode or down-counting mode in response to the direction instruction signal DIR from the control signal generating circuit 50, while it is reset by a reset signal from the monostable multivibrator 66. Moreover, the decoder circuit 68-2 generates a highlevel signal from one of output terminals "0" to "79" in accordance with the count data of the counter circuit 68-1. In the case where the side selection signal SS is at "1" level, the output selection circuit 68-3 generates the signals which are given to the input terminals "0" to "79" from the output terminals "0" to "79". When the side selection signal SS is at "0" level, the output selection circuit 68-3 generates the signals which were given to the input terminals "0" to "79" from the output terminals "4" to "83".

In this embodiment, it is assumed that 80 tracks are respectively formed on both the one and the other surface sides of the floppy disk 14 and where on the one surface side, four tracks are formed on the outer side from the outermost peripheral track formed on the other surface side, while on the other surface side, four tracks are formed on the inner side from the innermost peripheral track formed on the one surface side.

Assume now that the direction instruction signal DIR at "1" level and the step signal STP are generated from the control signal generating circuit 50, and that the carrier 20 is driven by the motor 22 in the direction apart from the floppy disk 14. In this case, when the light from the light emitting diode 32A to the phototransistor 32B is interrupted by the projecting portion 20A of the carrier 20 and at the same time the Q output signals of "1" are generated from the flip-flops 56 and 58, a "0" level signal is generated from the NAND gate 52. The monostable multivibrator 66 generates the reset signal RST in response to the "0" level signal from the NAND gate 52, thereby resetting the counter circuit 68-1 of the head control circuit 68. Now assuming that the side selection signal SS at "1" level is generated from the control signal generating circuit 50, the head driver 74 is selected, while the output selection circuit 68-3 is set into the first, output selection mode, thereby generating output signals responsive to the input signals from decoder circuit 68-2 to input terminals "0" to "79", from the output terminals "0" to "79", respectively. In this state, since the content of the counter circuit 68-1 is "0", a "1" level signal is generated from the output terminal "0" of the decoder circuit 68-2. This allows a "1" level signal to be generated from the output terminal "0" of the output selection circuit 68-3, so that the delay circuit D1 is set into the operative mode. In this case, the other delay circuits D2 to D84 are set into the nonoperative mode. Under such a state, when the motor drive signal to drive the motor 16 and the write signal WS are generated from the control signal generating circuit 50, the write operation to write the data from the read/write control circuit 77 in the track zero location of the floppy disk 14 is started. At this time point, since the flip-flop 70 is reset and the transistor 72 is nonconductive, the erase head section 26-1 is nonoperative. After the write-in pulse generated from the write-in pulse generator 68-4 in response to the leading edge of the write signal WS is delayed by a predetermined delay time by the delay circuit D1, it is supplied to the trigger terminal T of the flip-flop 70 through the OR gate 68-5. Due to this, data "1" is set into the flip-flop 70 and the $\bar{Q}$ output signal at "0" level is generated from the flip-flop 70, thereby causing the transistor 72 to be turned on. When the delay time determined by the delay circuit D1 has elapsed after the write signal was generated in this way, the erase head section 26-1 is made operative. That is, when the delay time of the delay circuit D1 has elapsed after the read/write head section 26-2 started the write operation, the erase head section 26-1 starts the erase operation. Although the write operation is immediately stopped when the write signal is interrupted, the erase operation is continuously executed until the write-in pulse to be generated from the write-in pulse generator 68-4 responsive to the trailing edge of the write signal WS, is delayed by the delay circuit D1 and is supplied to the trigger terminal T of the flip-flop 70 through the OR gate 68-5, thereby causing the $\overline{Q}$ output signal at "1" level to be generated from this flip-flop to make the transistor 72 nonconductive.

As described above, in case of writing data in the outermost peripheral track on the one surface side of the floppy disk 14, it is possible to make the erase start and stop positions on this track coincide with the write start and stop positions, respectively, since the delay times of the operation start and stop timings of the erase head section 26-1 for the operation start and stop timings of the read/write head section 26-2, are determined by the delay time of the delay circuit D1.

When the direction instruction signal of "0" and the step signal are generated from the control signal generating circuit 50 and when the magnetic head is moved by one track in the inner peripheral direction, the count data of the counter circuit 68-1 becomes "1" and a "1" level signal is generated from the output terminal "1" of the output selection circuit 68-3, so that only the delay circuit D2 is set into the operative mode. In the case of writing data in this track, it is possible to make the erase start and stop positions on this track coincide with the write start and stop positions, respectively, since the delay times of the operation start and stop timings of the erase head section 26-1 with respect to the operation start and stop timings of the read/write head section 26-2, are determined by the delay time of the delay circuit D2.

In this way, even when the magnetic head 26 is in any track position, it is possible to make the erase start and stop positions on each track coincide with the write start and stop positions, respectively.

In addition, in the case where the side selection signal of "0" is generated, the head driver 76 is selected and the output selection circuit 68-3 is set into the second output selection mode, thereby generating the output signals corresponding to the input signals to the input terminals "0" to "79" from the output terminals "4" to "83", respectively. It is now assumed that the magnetic head 28 locates on the outermost peripheral track and the counter circuit 68-1 has a count data of "0". In this state, a "1" level signal is generated from the output terminal "0" of the decoder circuit 68-2 and a "1" level signal is generated from the output terminal "4" of the output selection circuit 68-3, thereby making the delay circuit D5 operative. Therefore, in the case of writing data in the outermost peripheral track on the other surface side of the floppy disk 14, the delay times of the operation start and stop timings of the erase head section 28-1 for the operation start and stop timings of the read/write head section 28-2, are determined by the delay time of the delay circuit D5.

As described above, even when the magnetic head 26 or 28 is on any track, by setting the delay times of the delay circuits D1 to D83 in accordance with the circumferential speeds of these tracks, the erase start and stop positions on each track can be made to coincide with the write start and stop positions, respectively.

Figure 7:
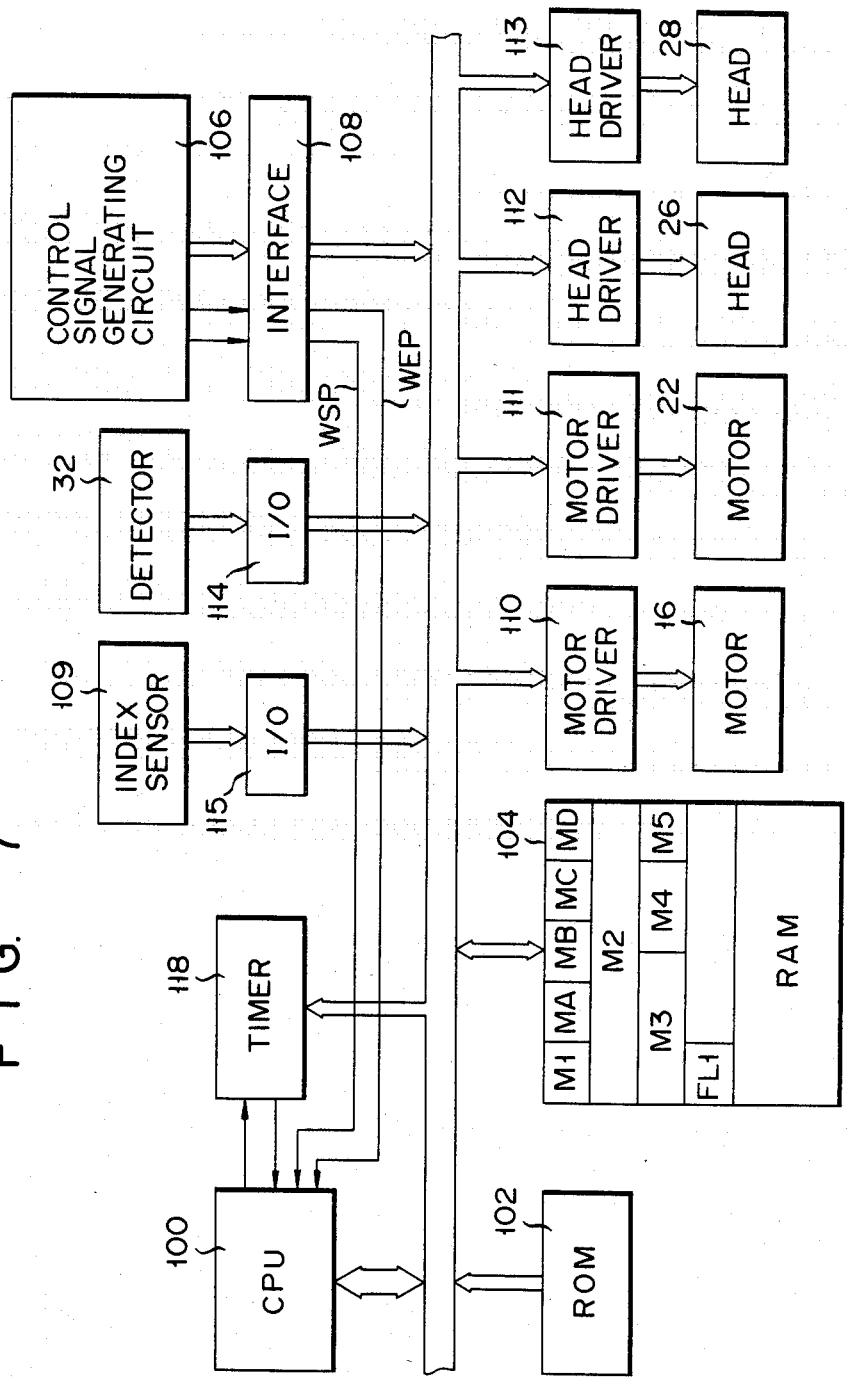
FIG. 7 is a block diagram of a magnetic disk drive apparatus according to another embodiment of the present invention.

FIG. 7 is a block diagram of a floppy disk drive apparatus according to another embodiment of the present invention. This floppy disk drive apparatus comprises a central processing unit 100; a read only memory (ROM) 102 and a random access memory (RAM) 104 coupled to the CPU 100 through a data bus; and a control signal generating circuit 106 coupled to the CPU 100 through an interface 108. Furthermore, the motors 16, 22, magnetic heads 26, 28, outer peripheral limit position detector 32, and an index sensor 109 are coupled to the CPU 100 through motor drivers 110, 111, head drivers 112, 113, and I/O ports 114, 115, respectively. Moreover, a timer circuit 118 is coupled to the CPU 100. A time data from the RAM 102 is selectively set to the timer circuit and when it finishes counting the time responsive to this time data, it gives an interruption signal to the CPU 100.

The RAM 104 includes a memory area M1 for storing specified data to inhibit the magnetic heads 26 and 28 from being driven toward the inner peripheral direction of the floppy disk 14 immediately after the power supply is turned on; memory areas MA, MB, MC, and MD for storing data corresponding to the drive signals $\phi_A$, $\phi_B$, $\phi_C$, and $\phi_D$; a memory area M2 for storing data indicative of a track position on the floppy disk 14 where the magnetic head 26 or 28 exists; a memory area M3 for storing data representing one of the track groups at which the magnetic head 26 or 28 is positioned, the track groups being obtained by dividing the tracks into a plurality of groups; a memory area M4 for storing data representative of a track position in the above-mentioned track groups where the magnetic head 26 or 28 exists; and a memory area M5 for storing data responsive to the side selection signal SS from the control signal generating circuit 106.

The control signal generating circuit 106 generates the step signal STP and direction instruction signal DIR which are necessary to drive the motor 22, side selection signal SS to select the magnetic head 26 or 28, write-in start and end pulses, and motor control signal to drive the motor 16, etc. in response to key signals from, e.g., an external keyboard circuit.

Figure 8:
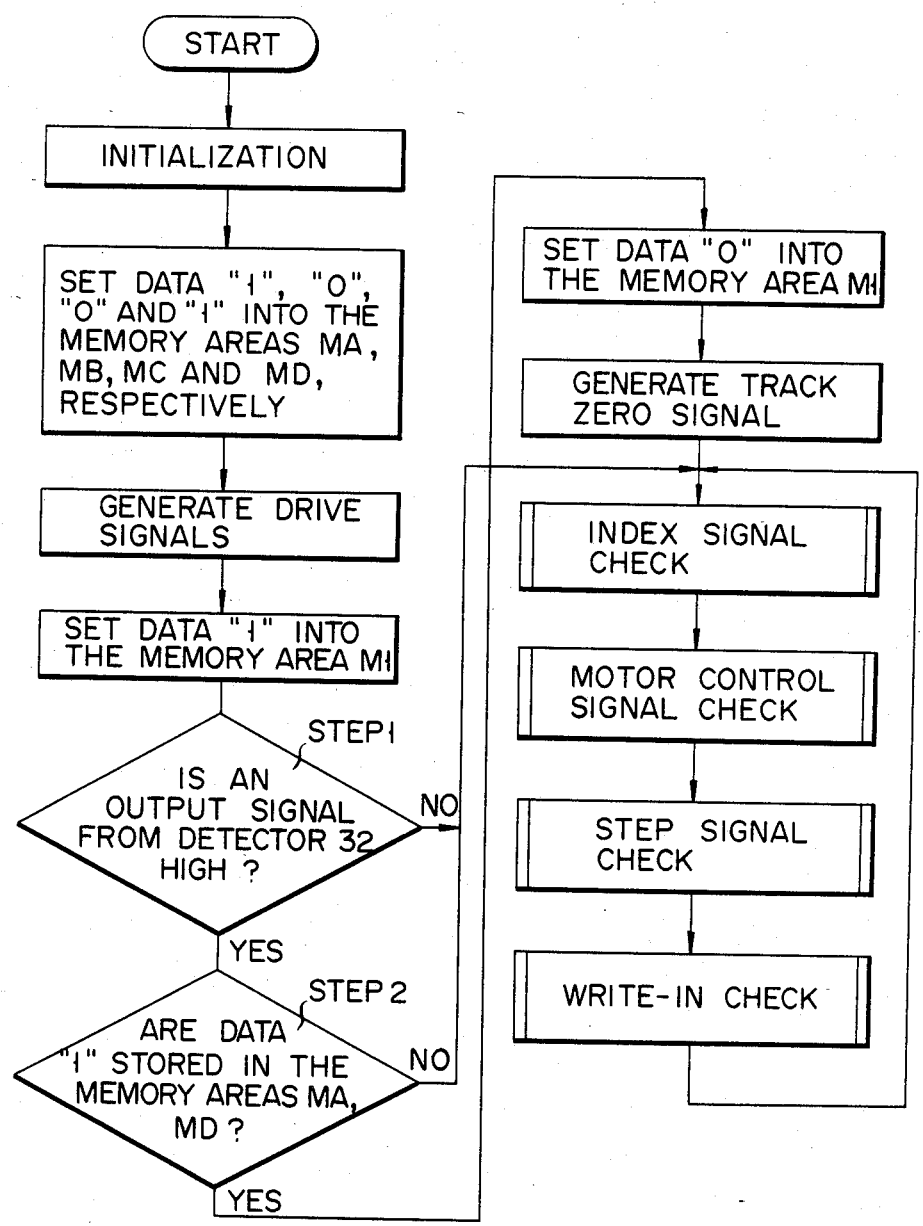
FIG. 8 shows a main routine executed by a CPU which is used in the magnetic disk drive apparatus shown in FIG. 7.

The CPU 100 executes a main routine as shown in FIG. 8 on the basis of the program data stored in the ROM 102. Firstly, when the power supply is turned on, the CPU 100 executes the initialization processing to clear the content of the RAM 104 and to write invalid data in the memory area M3, etc. Next, the CPU respectively sets data "1", "0", "0", and "1" into the memory areas MA, MB, MC, and MD of the RAM 104 and at the same time it supplies the drive signals $\phi_A$, $\phi_B$, $\phi_C$, and $\phi_D$ responsive to the contents of these memory areas MA, MB, MC, and MD to the motor driver 111. Then, data "1" is set into the memory area M1. Subsequently, it is checked whether a high-level output signal is generated from the detector 32 or not, namely, whether or not the light from the light emitting diode 32A is interrupted by the projecting portion 10A of the carrier 10 in STEP 1. In the case where it is detected that the high-level output signal is generated from the detector 32, it is further checked whether or not data "1", "0", "0", and "1" are stored in the memory areas MA, MB, MC, and MD, respectively, in STEP 2. If an answer "YES" is obtained in this STEP 2, the CPU 100 sets data "0" into the memory area M1 and at the same time it generates a track zero signal representing that the magnetic head 26 is at present in the zero track position. In addition, if an answer is "NO" in STEP 1 or 2, the CPU 100 executes an index signal check to control the rotation of the motor 16 responsive to an output signal from the index sensor 109, a motor control signal check to control the rotation of the motor 16 responsive to a motor control signal from the control signal generating circuit 106, a step signal check which will be described later, and a write-in check to execute the read-write operation for the floppy disk 14 through the magnetic head 26 or 28 in response to a write/read signal from the control signal generating circuit 106.

Figure 9:
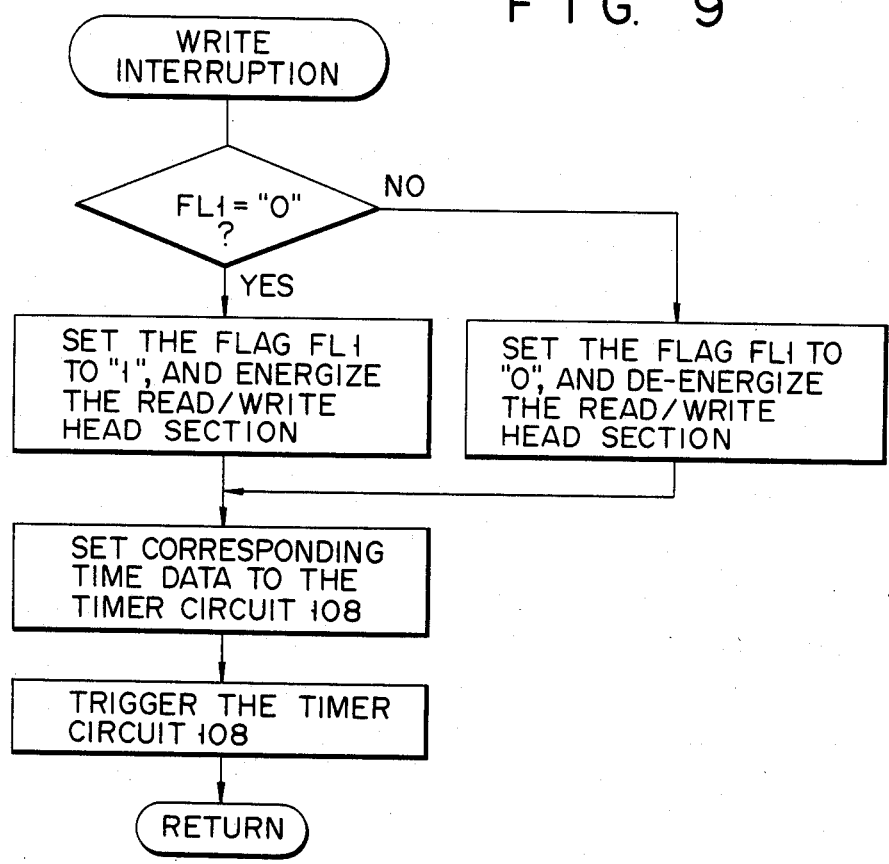
FIGS. 9 and 10 show flow charts of a write-in interruption and a timer interruption which are executed by the CPU shown in FIG. 7.
Figure 10:
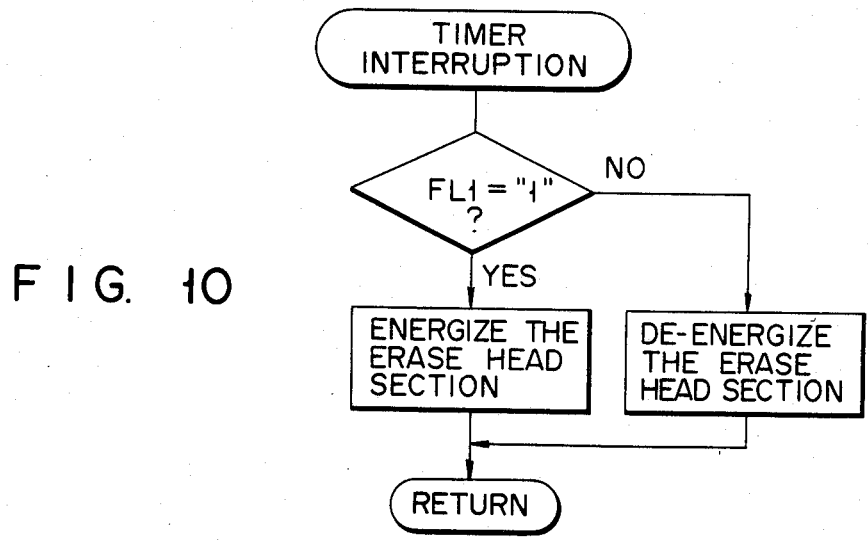

FIG. 9 shows a write-in interruption routine which the CPU 100 executes in response to a write-in start pulse WSP or a write-in end pulse WEP from the control signal generating circuit 106. Namely, the CPU 100 checks whether a write-in interruption flag FL1 is "0" or "1" when the write-in start pulse WSP or write-in end pulse WEP is generated as an interruption signal from the control signal generating circuit 106. When this write-in interruption flag FL1 is "0" or "1", the CPU 100 rewrites the flag FL1 to "1" or "0", respectively, and at the same time it starts or stops the operation of the read/write head section of the magnetic head in response to whether the flag FL1 is "1" or "0". Thereafter, the CPU 100 sets the time data in accordance with the contents of the memory areas M3 and M5 into the timer circuit 118 and also sends a trigger signal to the timer circuit 118. When the time corresponding to the preset time data has passed, the timer circuit 118 supplies a timer interruption signal to the CPU 100. The CPU 100 executes a timer interruption routine shown in FIG. 10 in response to the interruption signal from the timer circuit 118. Namely, the CPU 100 first checks whether the flag FL1 is "0" or "1" and then starts or stops the operation of the erase head section of the magnetic head in dependence upon whether the flag FL1 is "1" or "0".

The CPU 100 sets the flag FL1 into "1" responsive to the write-in start pulse and, for example, writes the data generated from the control signal generating circuit 106 into the floopy disk 14 through the magnetic head 26 or 28 which is selected by the side selection signal SS or $\overline{SS}$. Thereafter, the CPU 100 energizes the erase head section of the selected one of the magnetic heads 26 and 28 in response to a timer interruption signal from the timer circuit 118. Similarly, the CPU 100 sets of the flag FL1 into "0" in response to the write-in end pulse to stop the operation of the read/write head section, and thereafter it stops the operation of the erase head section in response to the interruption signal from the timer circuit 118. In this way, even when the magnetic head 26 or 28 is in any track position, it is possible to start or stop the operation of the erase head section with a delay time which can be properly set after the operation of the read/write head section was started or stopped.

Figure 11A:
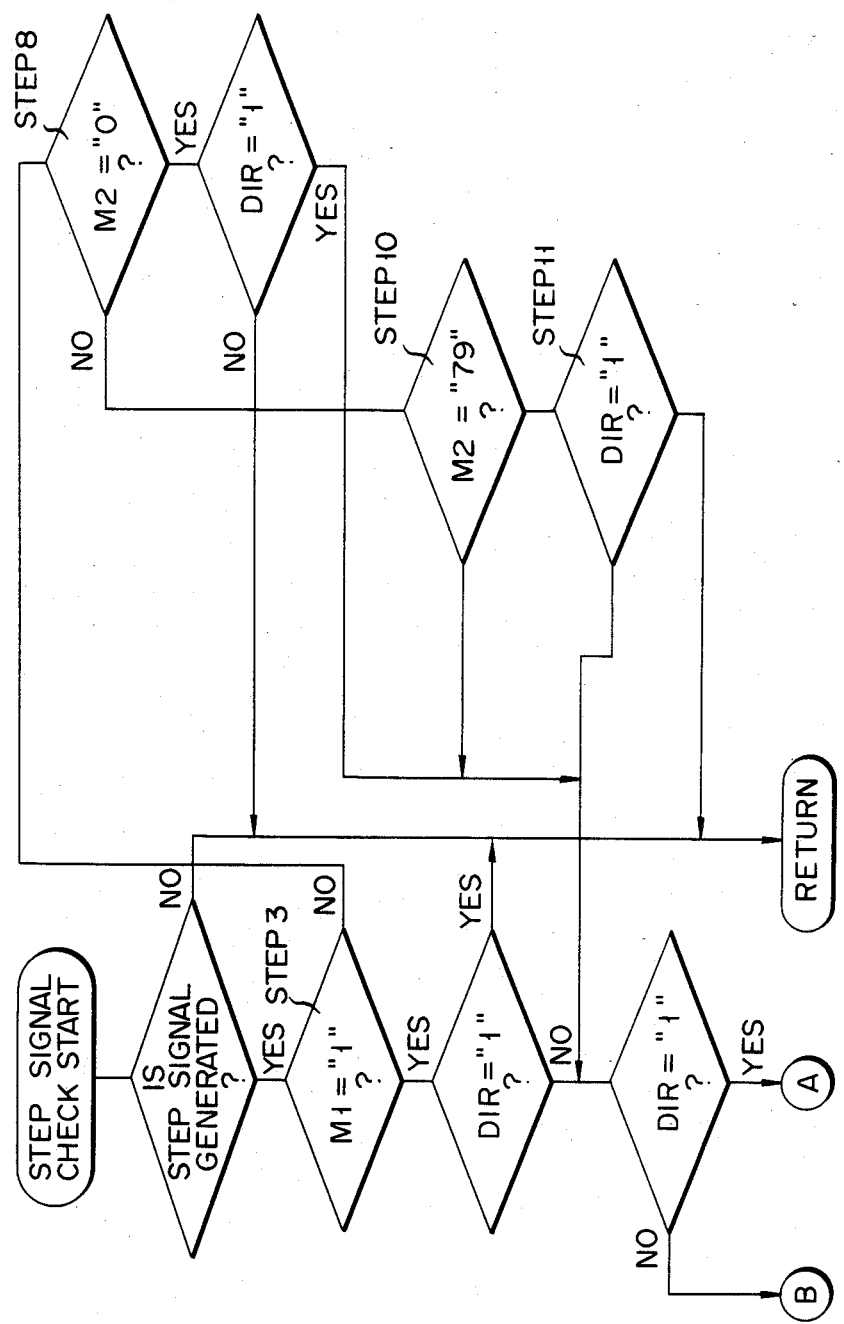
FIGS. 11A and 11B show flow charts of a step signal check which is included in the main routine shown in FIG. 8.
Figure 11B:
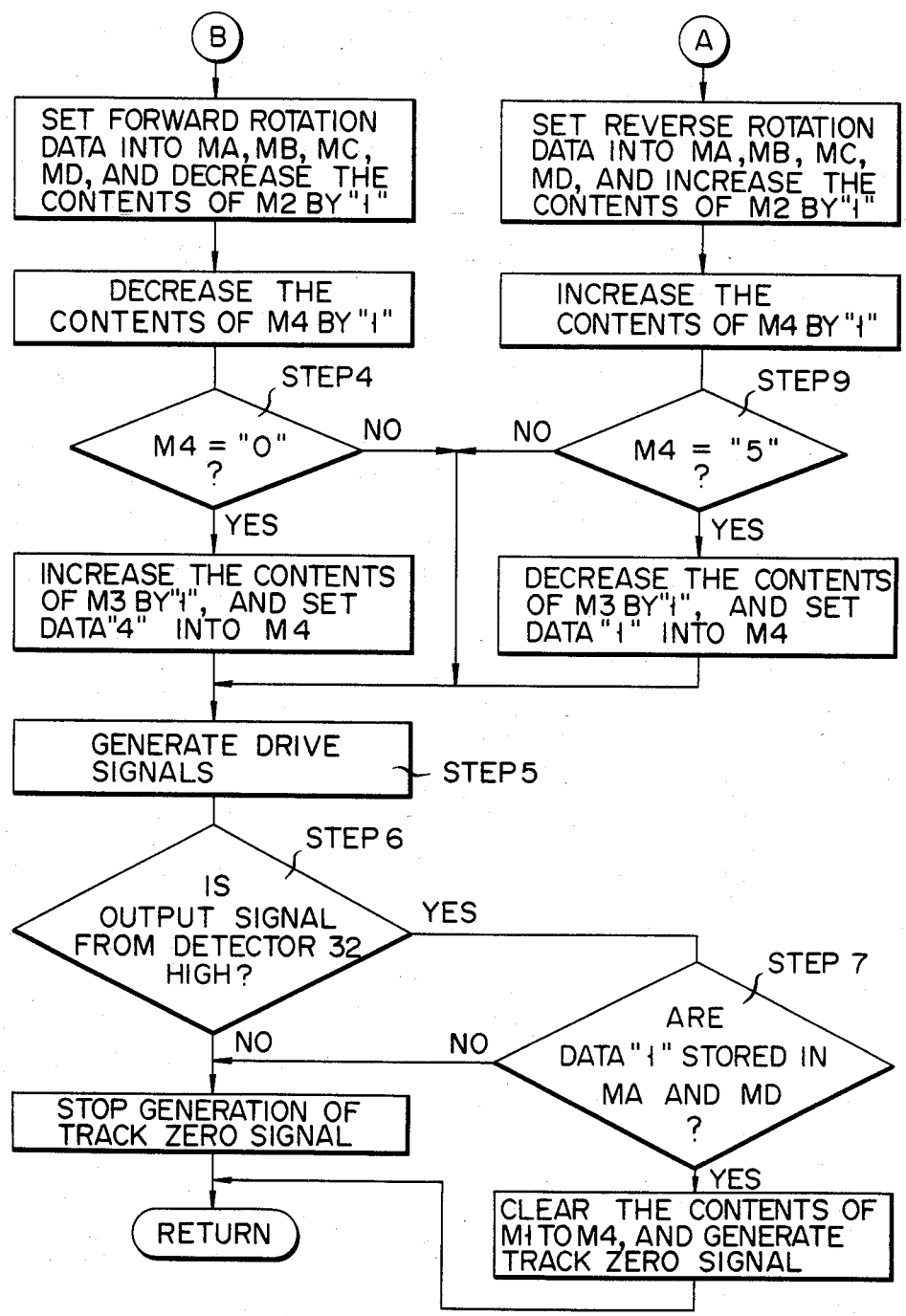

In the case of executing the step signal check subroutine shown in FIGS. 11A and 11B, the CPU 100 first checks whether the step signal STP is generated from the control signal generating circuit 106 or not. If it is detected that the step signal STP is not generated in this step, the CPU 100 executes the next processing in the main routine, i.e., the subroutine of the motor control signal check. In addition, when detecting that the step signal is generated in this step, the CPU 100 checks whether or not data "1" is stored in the memory area M1. When detecting that data "1" is stored in the memory area M1 in STEP 3, the CPU 100 then checks whether or not the direction instruction signal DIR from the control signal generating circuit 106 is at "1" level. If it is detected in this step that the direction instruction signal DIR is at "1" level, the CPU 100 returns the processing to the main routine. Also, if it is detected in this step that the direction instruction signal DIR is at "0" level, the CPU 100 stores data to rotate the motor 12 in the forward direction into the memory areas MA, MB, MC, and MD, respectively, and at the same time it reduces the content of the memory area M2 by one count. Then, after the content of the memory area M4 is reduced by one count, the content of memory area M4 is checked whether it becomes "0" or not in STEP 4. In the case where it is detected in STEP 4 that the content of memory area M4 is "0", the CPU 100 increases the content of the memory area M3 by one count and sets data "4" into the memory area M4. Furthermore, the CPU 100 then generates the drive signals $\phi_A$, $\phi_B$, $\phi_C$, and $\phi_D$ responsive to the contents of the memory areas MA, MB, MC, and MD in STEP 5 to rotate the motor 22 by one step in the forward direction, thereby allowing the magnetic head 26 or 28 selected by the side selection signal SS or $\overline{SS}$ to be moved by one track in the outer peripheral direction. If the answer is "NO" in STEP 4, then STEP 5 will be also executed. The CPU 100 then checks in STEP 6 whether an output signal from the detector 32 is at a high level or not, i.e., whether the light from the light emitting diode 32A is interrupted by the projecting portion 10A or not. When it is detected that a low-level signal is generated from the detector 32, the CPU 100 stops the generation of the track zero signal. In addition, when it is detected in STEP 6 that a high-level signal is generated from the detector 32, the CPU 100 checks in STEP 7 whether data "1", "0", "0", and "1" are respectively stored in the memory areas MA, MB, MC, and MD or not, i.e., whether the magnetic head is in the track zero position or not. If the answer in STEP 7 is "YES", the CPU 100 clears the contents of the memory areas M1 and M2 and thereafter generates the track zero signal. If the answer in STEP 7 is "NO", the CPU 100 stops the generation of the track zero signal.

In the case where it is detected that data "0" is set into the memory area M1 in STEP 3, the CPU 100 checks whether data "0" is stored in the memory area M2 or not in STEP 8. If the answer in STEP 8 is "YES", namely, when it is detected that the magnetic head 26 or 28 is in the track zero position, the CPU 100 checks whether the direction instruction signal DIR is at "1" level or not. In the case where the CPU 100 detects that the direction instruction signal at "0" level is generated, it returns the processing to the main routine, while in the case where it is detected that the direction instruction signal at "1" level is generated, the CPU 100 sets data to rotate the motor 22 in the reverse direction into the memory areas MA, MB, MC, and MD and at the same time it increases the content of the memory area M2 by one count. Then, after the content of the memory area M4 is decreased by one count, the CPU 100 checks whether the content of the memory area M4 becomes "5" or not in STEP 9. If it is detected that the content of the memory area M4 is "5" in STEP 9, the CPU 100 decreases the content of the memory area M3 by one count and then sets data "1" into the memory area M4. Furthermore, the CPU 100 then generates the drive signals $\phi_A$, $\phi_B$, $\phi_C$, and $\phi_D$ responsive to the contents of the memory areas MA, MB, MC, and MD to move the magnetic heads 26 and 28 by one track in the inner peripheral direction and then executes STEP 6 described previously. If the answer in STEP 9 is "NO", then STEP 5 will be also executed similarly. In addition, when it is detected in STEP 8 that data "1" is stored in the memory area M2, the CPU 100 checks whether data "79" is stored in the memory area M2 or not, i.e., whether the magnetic head 26 exists in the inner peripheral limit position or not, in STEP 10. If the answer in STEP 10 is "YES", it is checked whether the direction instruction signal DIR is at "1" level or not, in STEP 11. In the case where it is detected here that the direction instruction signal DIR at "1" level is generated, the CPU 100 returns the processing to the main routine. If the answer in STEP 10 or 11 is "NO", the CPU 100 sets data to rotate the motor 22 in the forward direction into the memory areas MA, MB, MC, and MD as described before and decreases the content of the memory area M2 by one count. Thereafter, it permits the magnetic heads 26 and 28 to be moved by one track in the outer peripheral direction.

Assume now that the magnetic heads 26 and 28 are moved in the outer peripheral direction under a condition that data "1" is stored in the memory area M1 and the movement of the magnetic heads 26 and 28 in the inner peripheral direction is inhibited. In this case, when it is detected that data "1" is stored in the memory area M1 in STEP 3, and that the direction instruction signal DIR at "0" level is generated, the CPU 100 sets data to rotate the motor 22 forwardly in the memory areas MA, MB, MC, and MD, and at the same time it decreases the content of the memory area M2 by one count. Thereafter, the CPU 100 generates the drive signals $\phi_A$, $\phi_B$, $\phi_C$, and $\phi_D$ to the motor driver 111, thereby rotating the motor 22 by one step in the forward direction. Due to this, the magnetic head 26 is moved by one track in the outer peripheral direction. Similar operations are repeatedly executed so long as the step signal and the direction instruction signal at "1" level are generated from the control signal generating circuit 106. Thereafter, when the magnetic head 26 or 28 reaches near the outer peripheral limit position and the light from the light emitting diode 32A to the phototransistor 32B is interrupted by the projecting portion 10A, the CPU 100 detects that a high-level signal is generated from the detector 32 in STEP 6 and then executes STEP 7. The CPU 100 further generates the drive signals $\phi_A$, $\phi_B$, $\phi_C$, and $\phi_D$ to rotate the motor 22 in the forward direction until it is detected that data "1", "0", "0", and "1" are stored in the memory areas MA, MB, MC, and MD in STEP 7. If it is detected in STEP 7 that data "1", "0", "0", and "1" are respectively stored in the memory areas MA, MB, MC, and MD, the CPU 100 clears the contents of the memory areas M1 and M2 and generates the track zero signal. In the case where another step signal check subroutine is executed in the next cycle, in STEPs 3 and 8, it is detected that data "0" is set into the memory areas M1 and M2 and it is further detected that the direction instruction signal at "0" level is generated, and the subroutine of the step signal check is finished. Thereafter, when the direction instruction signal DIR from the control signal generating circuit 106 becomes "1" level, the CPU 100 sets data to rotate the motor 22 reversely into the memory areas MA, MB, MC, and MD, and at the same time it increases the contents of the memory areas M2 and M4 by one count. Next in STEP 9, it is checked whether the content of the memory area M4 becomes "5" or not. That is, it is checked whether the magnetic head 26 or 28 is moved from a certain track group to a next track group or not. If an answer of "YES" is obtained in STEP 9, i.e., when it is detected that the magnetic head 26 or 28 is moved from a certain track group to a next track group, the CPU 100 decreases the content of the memory area M3 by one count and at the same time it sets data "1" into the memory area M4. This content of the memory area M3 determines the time data to be set into the timer circuit 118 cooperatively with the content of the memory area M5. For example, in the case where the content of the memory area M3 is "0" and the content of the memory area M5 is "1", the time data corresponding to the circumferential speed at the outermost peripheral track on the one surface side of the floppy disk 14 is given to the timer circuit 118. When the content of the memory area M3 is "0" and the content of the memory area M5 is "0", the time data corresponding to the circumferential speed at the outermost peripheral track on the rear side of the floppy disk 14 is given to the timer circuit 118. Thereafter, the CPU 100 generates the drive signals $\phi_A$, $\phi_B$, $\phi_C$, and $\phi_D$ responsive to the data in the memory areas MA, MB, MC, and MD, thereby moving the magnetic head 26 by one track in the inner peripheral direction. Thereafter, the CPU 100 executes STEPs 6 and 7, and stops the generation of the track zero signal. The magnetic heads 26 and 28 are moved by one track in the inner peripheral direction in the subroutine of the step signal check in the subsequent cycle, and the content of the memory area M2 is increased by one count. In this case, the content of the memory area M3 is decreased by one count whenever the magnetic heads 26 and 28 are moved by four tracks in the inner peripheral direction, In other words, the time data corresponding to the track position on which the magneti6 head 26 or 28 exists is obtained, and in the write-in mode, the operation of the erase head section is started or stopped after the delay time corresponding to the proper time data to be determined by the contents of the memory areas M3 and M5, with respect to the operation start or stop timing of the read/write head section. In addition, in the case where the magnetic heads 26 and 28 are moved in the outer peripheral direction, the content of the memory area M3 is increased by one count whenever the magnetic head 26 or 28 is moved by four tracks in the outer peripheral direction. As descrived above, in this embodiment, a substantially similar effect as in the embodiment shown in FIGS. 5 and 6, is obtained.

Although the present invention has been described with respect to embodiments in the above, the present invention is not limited to only these embodiments. For example, in the embodiment shown in FIG. 7, it may be possible to omit the memory area M5 and to decrease or increase the content of the memory area M3 by one count whenever the magnetic head 26 or 28 is moved by one track in the outer peripheral or inner peripheral direction of the floppy disk 14.

In addition, in the head control circuit 68 shown in FIG. 6, it is possible to divide the output terminals "0" to "83" of the output selection circuit 68-3 into 21 subsections and to use 21 delay circuits in place of the delay circuits D1 to D84, thereby coupling each of the output terminal groups "0" to "3", "4" to "7", ..., and "80" to "83" of the output selection circuits with the 21 delay circuits, respectively.

Furthermore, it is possible to constitute each of the delay circuits D1 to D84 shown in FIG. 6 by a monostable multivibrator similar to the monostable multivibrator 66 shown in FIG. 5. In this case, the output terminal of the pulse generator 68-4 and corresponding one of output terminals "0" to "83" of the output selection circuit 68-3 are coupled to the B input terminal and reset terminal of each monostable multivibrator, respectively, and the power supply terminal $+V$ is coupled to the A input terminal.

What is claimed is:

1. A magnetic disk drive apparatus, comprising:
   first drive means for rotating a magnetic disk having a plurality of tracks on each side, wherein said plurality of tracks on a first side of the magnetic disk are formed radially inwardly of those formed on a second side opposite said first side, respectively, and some of the tracks on said first side each have substantially the same diameter as a corresponding one of the tracks formed at the same position on the second side;

a data generating circuit for generating track position designation data and a side selection signal;

a magnetic head mechanism including first and second magnetic heads each having read/write and erase sections set apart by a predetermined distance along one of the tracks of said magnetic disk, and which magnetic heads oppose each other when the magnetic disk is inserted between said magnetic heads, the read/write and erase sections of said first magnetic head being positioned at predetermined distances from those of said second magnetic head in the radial direction of the magnetic disk;

second drive means for moving said magnetic head mechanism to a track position designated by the track position designation data and said side selection signal; and control means for selectively starting and stopping the operation of said erase head sections when a delay time determined by the track position data and said side selection signal has passed after a corresponding start and stop of the operation of said read/write head sections in a write-in mode, the same delay time being provided by said control means for those tracks formed on both said first and said second sides of the magnetic disk and which have substantially the same diameter;

said control means comprising a track position data generating circuit for generating track position data representing the numbers of the two tracks on which said first and said second magnetic heads exist in response to said track position designation data; a selection signal generating circuit for generating an output signal from one of a plurality of output terminals which is selectively energized in accordance with the track position data from said track position data generating circuit and to said side selection signal; a plurality of delay circuits each having an associated delay time and which are respectively coupled to the output terminals of said selection signal generating circuit to be selectively energized by output signals from said selection signal generating circuit; the same delay circuit being energized when either of the tracks having substantially the same diameter on said first and said second sides of the magnetic disk is designated; and a write-in control signal generating circuit for directly supplying either of an operation start and an operation stop signal to the read/write head section of a selected one of said first and second magnetic heads in the write-in mode, and for supplying one of the operation start and stop signal to the erase head section of said selected on of said first and second magnetic heads through one of said plurality of delay circuits.

2. A magnetic disk drive apparatus, comprising:

first drive means for rotating a magnetic disk having a plurality of tracks on each side, wherein said plurality of tracks on a first side of the magnetic disk are formed radially inwardly of those formed on a second side opposite said first side, respectively, and some of the tracks on said first side each have substantially the same diameter as a corresponding one of the tracks formed at the same position on the second side;

a data generating circuit for generating track position designation data and a side selection signal;

a magnetic head mechanism including first and second magnetic heads each having read/write and erase sections set apart by a predetermindd distance along one of the tracks of said magnetic disk, and which magnetic heads oppose each other when the magnetic disk is inserted between said magnetic heads, the read/write and erase sections of said first magnetic head being positioned at predetermined distances from those of said second magnetic head in the radial direction of the magnetic disk;

second drive means for moving said magnetic head mechanism to a track position designated by the track position designation data and said side selection signal; and control means for selectively starting and stopping the operation of said erase head sections when a delay time determined by the track position data and said side selection signal has passed after a corresponding start and stop of the operation of said read/write head sections in a write-in mode, the same delay time being provided by said control means for those tracks formed on both said first and said second sides of the magnetic disk and which have substantially the same diameter;

said control means including memory means having a first memory area for storing track position data corresponding to said track position designation data and a second memory area for storing selected data corresponding to said side selection signal; a timer circuit; and a control unit for selectively supplying a write-in start or stop signal to the read/write head section of a selected one of said first and second magnetic heads in the write-in mode, and for setting time data corresponding to the contents of said memory areas into said timer circuit; said control unit supplying the operation start or stop signal to the erase head section of said selected one of said first and second magnetic heads in response to an output signal which is generated from said timer circuit when a time corresponding to said time data has passed.

* * * * *